(12) United States Patent
Angermann et al.

(10) Patent No.: US 10,010,984 B2
(45) Date of Patent: Jul. 3, 2018

(54) METHOD FOR THE PRODUCTION OF A HEAT EXCHANGER, PARTICULARLY A SORPTION HEAT EXCHANGER

(71) Applicant: MAHLE Behr GmbH & Co. KG, Stuttgart (DE)

(72) Inventors: Hans-Heinrich Angermann, Stuttgart (DE); Steffen Brunner, Weissach im Tal (DE)

(73) Assignee: MAHLE Behr GmbH & Co. KG, Stuttgart (DE)

( * ) Notice: Subject to any disclaimer, the term of this patent is extended or adjusted under 35 U.S.C. 154(b) by 256 days.

(21) Appl. No.: 14/529,683

(22) Filed: Oct. 31, 2014

(65) Prior Publication Data
US 2015/0251282 A1    Sep. 10, 2015

(30) Foreign Application Priority Data

Oct. 31, 2013  (DE) .................. 10 2013 222 258

(51) Int. Cl.
*B23K 1/00*    (2006.01)
*B23P 15/26*    (2006.01)
(Continued)

(52) U.S. Cl.
CPC ............ *B23P 15/26* (2013.01); *B23K 1/0012* (2013.01); *B23K 35/0222* (2013.01);
(Continued)

(58) Field of Classification Search
CPC ........ B23P 15/26; B21D 53/08; F28F 21/082; F28F 2275/02; F28F 2275/04;
(Continued)

(56) References Cited

U.S. PATENT DOCUMENTS 3,552,488 A * 1/1971 Grill .................... F28D 9/0025
165/165
3,689,941 A    9/1972 Chartet
(Continued)

FOREIGN PATENT DOCUMENTS

| CN | 101769689 A | 7/2010 |
|---|---|---|
| CN | 102216718 A | 10/2011 |
| CN | 103221212 A | 7/2013 |
| DE | 891 483 C | 9/1953 |
| DE | 20 30 925 A1 | 1/1971 |
| DE | 24 35 925 A1 | 2/1975 |

(Continued)

OTHER PUBLICATIONS

Chinese Office Action dated Jul. 27, 2017.
Chinese Office Action for Chinese Application No. 201410593711.4 dated Dec. 22, 2017 with English translation.

*Primary Examiner* — Christopher Besler
(74) *Attorney, Agent, or Firm* — Muncy, Geissler, Olds & Lowe, P.C.

(57) ABSTRACT

A method for the production of a heat exchanger is provided, particularly a sorption heat exchanger, in which several components of the heat exchanger have a ferrous based material, such as pipes, the pipes finishing the bottoms, and the bottoms and the pipes enclosing the housing components are coffered and then soldered. In one method, which reliably realizes the soldering of the joints with different widths, a brazing foil is introduced during the coffering of the components of the heat exchanger formed of steel or stainless steel between the joints of the components of the heat exchanger, and then the joints are filled with a low-melting solder and soldered without flux material.

14 Claims, 3 Drawing Sheets

(51) Int. Cl.
    *B23K 35/26*        (2006.01)
    *B23K 35/02*        (2006.01)
    *B23K 103/02*      (2006.01)
    *F25B 30/04*        (2006.01)
    *B23K 101/14*      (2006.01)
    *B23K 103/04*      (2006.01)
    *F25B 35/04*        (2006.01)
    *F25B 37/00*        (2006.01)

(52) U.S. Cl.
    CPC .......... *B23K 35/0233* (2013.01); *B23K 35/26* (2013.01); *B23K 35/262* (2013.01); *B23K 2201/14* (2013.01); *B23K 2203/02* (2013.01); *B23K 2203/04* (2013.01); *B23K 2203/05* (2015.10); *F25B 30/04* (2013.01); *F25B 35/04* (2013.01); *F25B 37/00* (2013.01); *F28F 2275/02* (2013.01); *F28F 2275/04* (2013.01); *Y02A 30/276* (2018.01); *Y10T 29/49359* (2015.01)

(58) Field of Classification Search
    CPC ............... F28F 2275/06; B23K 1/0012; B23K 2201/14; B23K 2203/02; B23K 2203/04; B23K 1/20; B23K 35/0233
    USPC .......................................... 228/183, 245–262
    See application file for complete search history.

(56) References Cited

U.S. PATENT DOCUMENTS

| | | | |
|---|---|---|---|
| 3,963,162 | A | 6/1976 | Taguchi et al. |
| 5,395,702 | A | 3/1995 | Carey, II et al. |
| 6,848,609 | B2 * | 2/2005 | Korischem ......... B23K 1/0012 148/23 |
| 8,235,275 | B1 * | 8/2012 | Stankowski ......... B23K 1/0018 228/119 |
| 2004/0038070 | A1 * | 2/2004 | Dockus ................ B23K 35/002 428/652 |
| 2011/0024037 | A1 * | 2/2011 | Becnel ................... B21D 53/02 156/295 |
| 2011/0220337 | A1 * | 9/2011 | Munari ................ B23K 1/0012 165/181 |
| 2012/0090345 | A1 | 4/2012 | Angermann et al. |
| 2014/0223955 | A1 | 8/2014 | Schiehlen et al. |

FOREIGN PATENT DOCUMENTS

| | | |
|---|---|---|
| DE | 43 09 500 A1 | 9/1993 |
| DE | 10 2011 079 586 A1 | 1/2013 |
| FR | 2 770 632 A1 | 5/1999 |
| JP | 621 66041 A | 7/1987 |
| JP | 021 69176 A | 6/1990 |
| JP | 2003 094135 A | 4/2003 |
| WO | WO 200808010344 A1 | 1/2008 |
| WO | WO 2010/112433 A2 | 10/2010 |

* cited by examiner

METHOD FOR THE PRODUCTION OF A HEAT EXCHANGER, PARTICULARLY A SORPTION HEAT EXCHANGER

This nonprovisional application claims priority under 35 U.S.C. § 119(a) to German Patent Application No. 10 2013 222 258.0, which was filed in Germany on Oct. 31, 2013, and which is herein incorporated by reference.

BACKGROUND OF THE INVENTION

Field of the Invention

The invention relates to a method for the production of a heat exchanger, particularly a sorption heat exchanger.

Description of the Background Art

Heat exchangers having ferrous based components are subject to specifications with respect to the tightness of the passages carrying the medium to the outside as well as the media against one another. If the leak rate exceeds a threshold value determined depending on the application, the heat exchanger must be discarded as a reject. Ferrous based heat exchangers which must meet demanding tightness criteria are often joined by welding, particularly laser welding, or by high temperature brazing. In doing so it is essential that the joining seam between the joints does not exceed certain widths, for example 0.2 mm, since otherwise the quality of the joint suffers or a gas proof joint might not materialize. However, the widths of such joints can often not be kept at the desired small seam width due to the production tolerance and the forming processes of the semi-manufactured products.

In order to overcome the discrepancy between the small necessary seam widths of the joint and the corresponding production tolerances of the semi-manufactured products, it is common to soft-solder the pre-coated components of the stainless steel heat exchanger. With low soldering temperatures this process can bridge the previously mentioned greater seam widths.

From WO 2010/112433 A2, which corresponds to US2012090345, which is incorporated herein by reference, a sorption heat exchanger is known which has flat tubes with a clear diameter of typically 1 mm through which a gas or a fluid flows and which may not be closed by the soldering process. In a typical immersion process the liquid brazing solder, driven by the capillary force, would flow into the flat tube and close it at least in part, thereby limiting the efficiency of the sorption heat exchanger.

A method for the manufacturing of a heat exchanger is known from DE 2 030 925 A1, which corresponds to U.S. Pat. No. 3,689,941, in which a ferrite stainless steel base material is first given a thin Sn—Pb coating, the components of a heat exchanger are produced from the coated semi-manufactured product through forming, and lastly the complicated heat exchanger is assembled by using flux material and is joined into a fluid tight heat exchanger with another Sn—Pb brazing solder.

DE 4 309 500 A1, which corresponds to U.S. Pat. No. 5,395,702, and which discloses a method for the immersion coating of a Fe-based semi-manufactured material, in particular a stainless steel semi-manufactured product, with a tinny alloy with at least 90% weight-% tin. This protects the emerging coated sheet. The tin coated stainless steel material is used as a top panel.

DE 2 435 925 A1, which corresponds to U.S. Pat. No. 3,963,162, and which describes a method for the soldering of stainless steel pipes, in which the stainless steel pipes are used as hot water pipes. A pipe joint with a defined clear diameter is filled with a soldering paste on tin basis, and after the fusing of the tin of the tin soldering paste an additional soft solder is added into the gap of the pipe joint.

SUMMARY OF THE INVENTION

It is therefore an object of the invention to provide a method for the manufacturing of a heat exchanger, in particular a sorption heat exchanger, in which flat pipes with a small clear diameter of typically 1 mm are not closed by the soldering process.

In an embodiment, a method is provided in which a brazing foil is used during the coffering of the components of the heat exchanger formed of steel or stainless steel between the joints of the components of the heat exchanger, and then the joints are filled with a low-melting solder, which are then soldered without flux material. Such a method has the advantage that the smaller as well as the larger joints of the heat exchanger can be reliably closed with the brazing foil for steel and stainless steel heat exchangers. In doing so, narrow structures, such as for example the narrow pipes which are passable by the fluid or gas during the operation of the heat exchanger, are not closed. At the same time the occurrence of organic vapors, released by evaporating flux materials, is prevented. By dispensing with flux materials, the activated carbon used as adsorbent agent is not affected, leaving its adsorption capacity fully intact. The fluid methanol, also utilized as an adsorbent in a sorption heat exchanger, remains unaffected, thereby reliably preventing a disruption in the function of the sorption heat exchanger. A corrosive damage of other internal components of the heat exchanger due to flux material deposits left behind after the soldering is effectively prevented.

Advantageously, a tin based solder or a lead-free zinc based solder is used as solder. These soldering materials melt at low temperatures and are therefore particularly suitable for the intended application.

In an embodiment the components of the heat exchanger formed of steel or stainless steel are pre-tinned, preferably with a lead-free tin basis alloy, prior to the coffering. Due to the pre-tinning of the surface of the components of the heat exchanger, it does not have to be activated with a flux material.

In order to permit a wetting of the component surfaces of the components of the heat exchanger with solder, the pre-tinning of the components of the heat exchanger formed of steel or stainless steel is accomplished by staining after an activation of the surfaces of the components.

Alternatively, the pre-tinning of the components formed of steel or stainless steel takes place after an activation of the surfaces of the components of the heat exchanger through a coating of the surfaces of the components of the heat exchanger with a precious metal or a precious metal alloy. The coating can be only gold, or can be a nickel-gold, a nickel-silver or a similar composition.

In an embodiment the approximately 0.02 to 0.10 mm thick brazing foil is pre-shaped prior to the application onto the steel or stainless steel components of the heat exchanger or it is reshaped during the coffering of the components of the heat exchanger. Thusly it is assured that all desired joints of the components of the heat exchanger can be reliably coated with a solder, thereby ensuring a solid connection of the joints.

In an embodiment, one bottom has a passage to the coffering of a pipe to form a bottom-pipe-joint, into which the brazing foil is inserted during the coffering, whereby the liquid solder is filled into an intake hopper which is formed by the passage coated with the brazing foil and the pipe after the insertion of the pipe in its contact range. Such an intake hopper leads to tight brazed seams.

In an embodiment the brazing foil can be placed around a frontal circumferential collar of the bottom during the coffering to form a bottom-housing-joint to position two housing half shells which are soldered to the bottom. With that, the joint between the bottom and the housing is reliably filled with solder and is closed.

The heat exchanger can be warmed only partially during the soldering. This prevents that the adhesive joints on the inside of the heat exchanger are not charged too much with a high temperature and thereby separate.

In an embodiment an induction brazing is utilized for the partial warming of the heat exchanger. Alternatively, a bypassing of the areas of the heat exchanger to be warmed is possible on a suitably long stretch lined by infrared thermal radiant heaters.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
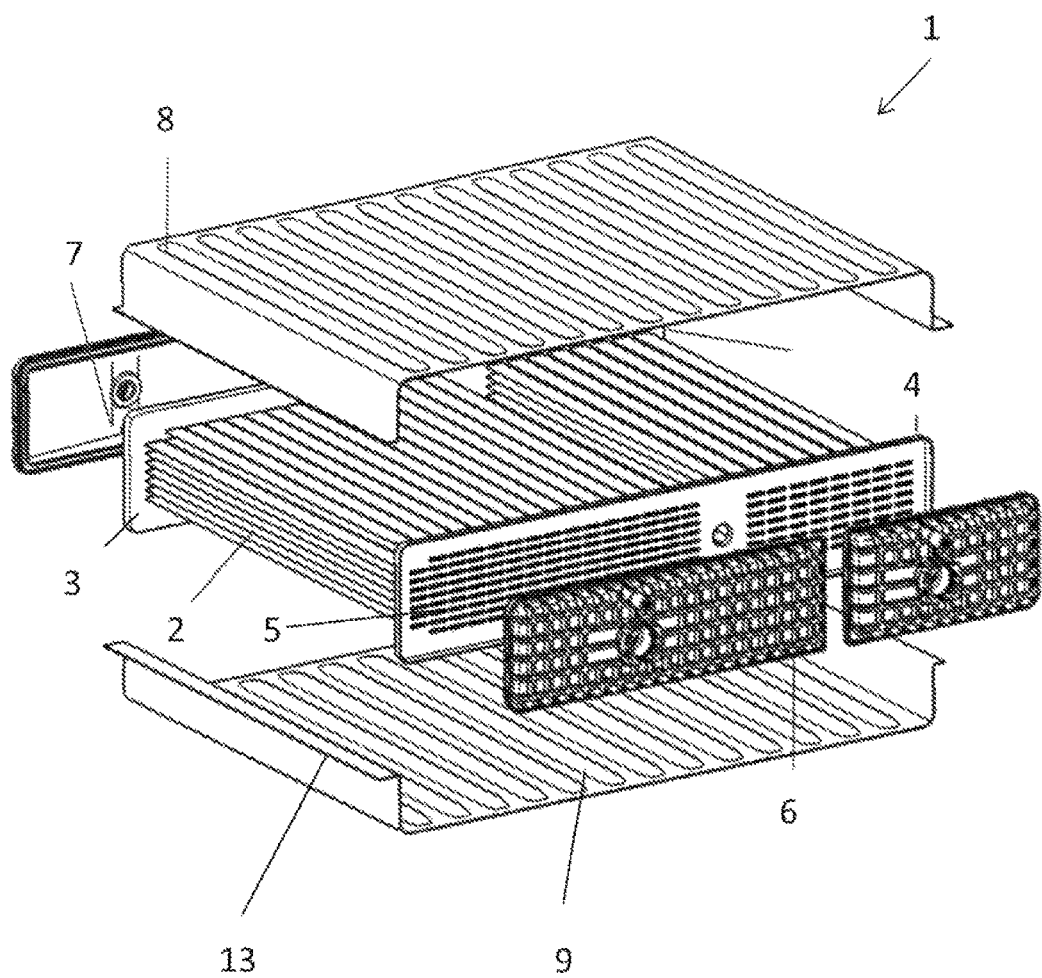
FIG. 1 illustrates an embodiment of a heat exchanger according to the invention.

The FIG. 1 shows a heat exchanger 1, preferably a sorption heat exchanger, comprised of a plurality of pipes 2, for example, flat tubes, which are arranged lying parallel next to each other. The respective ends of the pipes 2 are taken up by one bottom 3, 4 each, with each bottom 3, 4 having a number of passages 5 corresponding to the number of pipes 2, and each end of the pipe 2 engages into one of the passages 5. The bottom 4 is completed with a water tank 6 while a water tank 7 rests on the bottom 3. Two housing half shells 8, 9 enclose the interconnection of flat tubes 2 and bottoms 3, 4.

In such a heat exchanger, having the function of a sorption pump, a working medium, for example methanol, oscillates in the pipes 2 temperature-driven from one side of the functional space where the pipes 2 are charged with activated carbon, to another side of the function space where the pipes 2 are equipped with wick. The pipes 2, the bottoms 3, 4 as well as the housing half shells 8, 9 are made of steel or stainless steel and are pre-tinned with lead free tin-basis-alloys which also includes elemental tin. The pre-tinning takes place after the activation of the surface of bottom 3, 4, pipes 2 and housing half shells 8, 9 through staining, either galvanically or chemically. However, the activation via immersion tinning is possible as well. Of course, the surfaces of the bottoms 3, 4, the pipes 2 and the housing half shells 8, 9 can also be activated through a coating with gold, a nickel gold alloy or a nickel silver alloy. The heat exchanger 1 is soft-soldered after the coffering of the individual components without the utilization of flux material.

Figure 2:
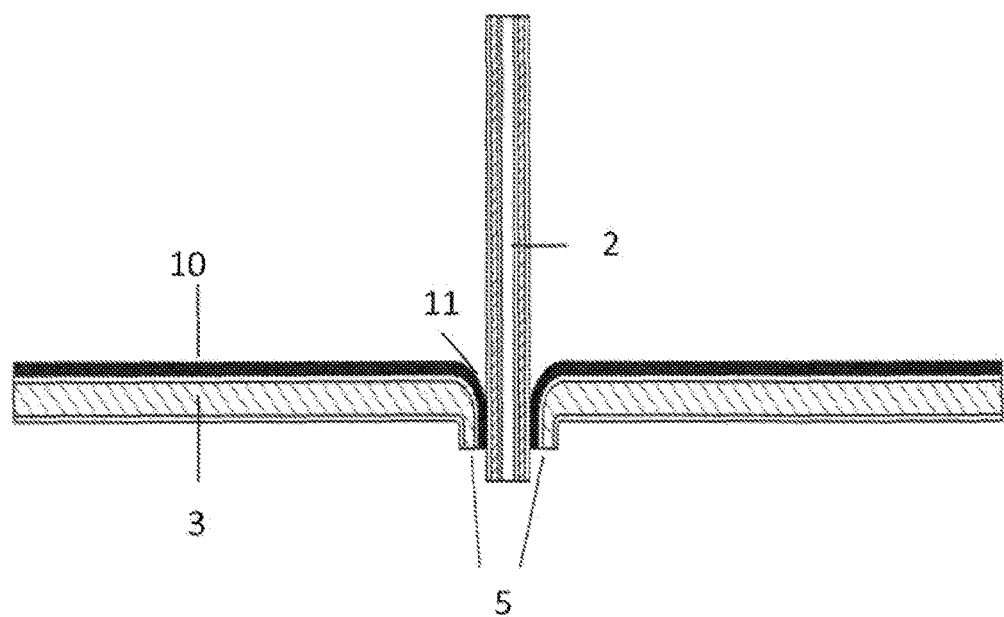
FIG. 2 illustrates an embodiment of the heat exchanger according to the invention.

FIG. 2 shows a pipe-bottom seam after the coffering of the heat exchanger 1 using the example of bottom 3. During the coffering the pre-tinned bottom 2 is charged with a tin based brazing foil 10 on the inside of the bottom prior to the insertion of the pipe 2 into the passage 5. It is to be understood that the inside of the bottom refers to the side facing the flat tube 2. With that, the brazing foil 10 is located between an external wall of the pipe 2 and the passage 5 of the bottom 3. The brazing foil has a thickness of <0.10 mm, preferably ≤0.05 mm. The brazing foil 10 is shaped during the coffering of the pipe 2 so that it will adjust to the form of the passage 5. The tinned pipe 2 inserted into the passage 5 forms an intake hopper 11 with the passage. This intake hopper 11 assures that the liquid solder fits well into the joint, which leads to reliably tight soldered joints.

Figure 3:
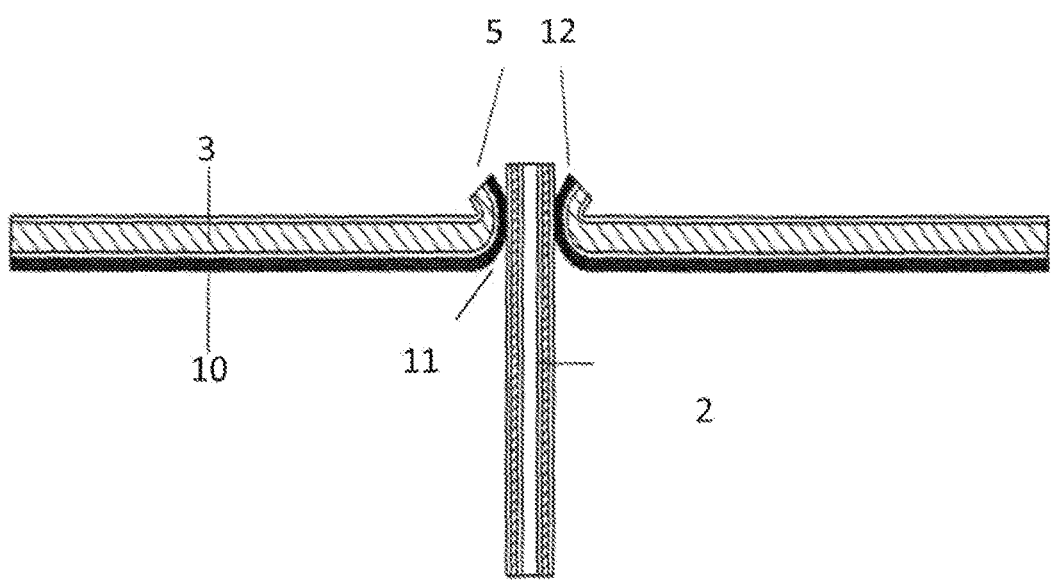
FIG. 3 illustrates an embodiment of the heat exchanger according to the invention.

Alternatively, FIG. 3 shows a pipe-bottom joint with an intake hopper 11, 12 constructed on both sides. This results from the side wall of the passage 5 being bent semicircular on which the brazing foil 10 lies. After the coffering of the tinned straight running pipe 2 into the bottom 3, intake hoppers 11, 12 are constructed on both sides of the contact point of the pipe 2 with the bottom 3. In this embodiment the heat exchanger 1 can be soldered standing as well as hanging. At the same time this also allows the realization of a reliable partial soldering of both sides of the components 2, 3, 4, 8, 9 of the heat exchanger 1. After the introduction of the liquid solder a soldering of the joints takes place utilizing the standard methods in chamber furnaces or continuous furnaces. However, it is preferred to only partially warm the heat exchanger 1 during the soldering so that the adhesive joints on the inside of the heat exchanger 1 are not charged too much with a temperature. Advantageously, induction brazing is utilized for the partial warming.

A bottom-housing joint, not further shown in the figures, is established analogously to the previously described pipe-bottom joint. During coffering the tin based brazing foil 10 is placed also around the frontal circumferential collar 13 around the bottom 3, 4, so that solder can be applied when the two half shells 8, 9 between the collar 13 of the bottom 3 and the housing half shells 8, 9 are installed. The longitudinal seam between the housing half shells 8, 9 can be joined, for example, by inserting wire and torch brazing.

The housing half shells 8, 9 can also be advantageously activated by pre-tinning to ensure a better soldering. In addition to a reliable soldering with tin based materials, tin also represents an effective protection against corrosion. The described heat exchanger 1 can thus be manufactured very cost-effectively by utilizing reasonably priced raw materials, thereby reducing waste due to reliably closed joints.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for manufacturing a heat exchanger, the method comprising:
coffering a plurality of components of the heat exchanger, the plurality of components formed of a ferrous based material and including at least one pipe, bottom plates and housing half-shells that enclose the at least one pipe and the bottom plates;

introducing, during the coffering of the components of the heat exchanger, a brazing foil between joints of the components, including between a joint of the at least one pipe and at least one of the bottom plates;

filling the joints with a low-melting solder; and soldering the plurality of components without flux material, wherein the at least one of the bottom plates has an opening, a surface of the at least one of the bottom plates being curved inwardly at the opening to form a curved passage through which the at least one pipe extends, wherein, during the introducing of the brazing foil, the brazing foil is applied to the surface of the at least one of the bottom plates and is shaped so as to curve inwardly and extend along the curved passage of the at least one of the bottom plates, and wherein a portion of the surface of the at least one of the bottom plates, that is provided in the curved passage through which the at least one pipe extends, opposes an exterior surface of the at least one pipe, and a portion of the brazing foil is positioned between the portion of the surface of the at least one of the bottom plates in the curved passage that opposes the exterior surface of the at least one pipe.

2. The method according to claim 1, wherein the solder is a tin based solder or a lead free zinc based solder.

3. The method according to claim 1, wherein the ferrous based material of the components of the heat exchanger is steel or stainless steel, and wherein the components are pre-tinned prior to the coffering with a lead free tin based alloy.

4. The method according to claim 3, wherein the pre-tinning of the components of the heat exchanger is accomplished after an activation of the surface of the components through staining.

5. The method according to claim 3, wherein the pre-tinning of the components of the heat exchanger is accomplished after an activation of the surfaces of the components through a coating of the surfaces of the components of the heat exchanger with precious metal or a precious metal alloy.

6. The method according to claim 1, wherein the brazing foil, which is approximately 0.02 mm to 0.10 mm thick, is pre-shaped prior to the application on the components of the heat exchanger or is reshaped during the coffering of the components of the heat exchanger, wherein the ferrous based material of the components is steel or stainless steel.

7. The method according to claim 1, wherein the solder is a liquid and the liquid solder is filled into an intake hopper that is formed out of the curved passage applied with the brazing foil and the at least one pipe after inserting the at least one pipe into its contact range.

8. The method according to claim 1, wherein for a formation of a bottom-housing joint the brazing foil is placed during coffering around a frontal circumferential collar of each of the bottom plates on which the two housing half shells to be soldered with the bottom plates are positioned.

9. The method according to claim 1, wherein the heat exchanger is warmed only partially during soldering.

10. The method according to claim 9, wherein induction soldering is utilized for the partial warming of the heat exchanger.

11. The method according to claim 1, wherein the heat exchanger is a sorption heat exchanger.

12. The method according to claim 1, wherein the solder is provided on the brazing foil at the joints of the components when the joints are filled with the solder.

13. The method according to claim 1, wherein the brazing foil is tin based.

14. The method according to claim 1, wherein the brazing foil, which is approximately 0.02 mm to 0.10 mm thick, is reshaped by bending of the brazing foil during the coffering of the components of the heat exchanger.

* * * * *